United States Patent
Utsunomiya et al.

(10) Patent No.: US 11,710,831 B2
(45) Date of Patent: Jul. 25, 2023

(54) GAS DIFFUSION ELECTRODE BASE MATERIAL AND PRODUCTION METHOD THEREFOR, AND SOLID POLYMER FUEL CELL

(71) Applicant: Toray Industries, Inc., Tokyo (JP)

(72) Inventors: Masamichi Utsunomiya, Otsu (JP); Fumitaka Watanabe, Otsu (JP)

(73) Assignee: Toray Industries, Inc., Tokyo (JP)

( * ) Notice: Subject to any disclaimer, the term of this patent is extended or adjusted under 35 U.S.C. 154(b) by 310 days.

(21) Appl. No.: 17/276,273

(22) PCT Filed: Sep. 26, 2019

(86) PCT No.: PCT/JP2019/037844
§ 371 (c)(1),
(2) Date: Mar. 15, 2021

(87) PCT Pub. No.: WO2020/067283
PCT Pub. Date: Apr. 2, 2020

(65) Prior Publication Data
US 2022/0029170 A1  Jan. 27, 2022

(30) Foreign Application Priority Data
Sep. 28, 2018  (JP) ................ 2018-183743

(51) Int. Cl.
*H01M 4/86* (2006.01)
*H01M 8/0245* (2016.01)
*H01M 8/1018* (2016.01)
*H01M 8/10* (2016.01)

(52) U.S. Cl.
CPC ......... *H01M 4/861* (2013.01); *H01M 4/8652* (2013.01); *H01M 4/8657* (2013.01); *H01M 8/0245* (2013.01); *H01M 8/1018* (2013.01); *H01M 2008/1095* (2013.01)

(58) Field of Classification Search
CPC .. H01M 4/861; H01M 4/8652; H01M 4/8657; H01M 8/0245; H01M 8/1018; H01M 2008/1095; H01M 4/8817; H01M 4/8605; H01M 8/0234; H01M 4/8642; H01M 8/0243
See application file for complete search history.

(56) References Cited

U.S. PATENT DOCUMENTS

2017/0317357 A1  11/2017  Utsunomiya et al.

FOREIGN PATENT DOCUMENTS

| EP | 3217456 A1 | 9/2017 |
| EP | 3396752 A1 | 10/2018 |
| JP | 2006310201 A | 11/2006 |
| JP | 2011171182 A | 9/2011 |
| JP | 2011195374 A | 10/2011 |
| JP | 2013164896 A | 8/2013 |
| JP | 2018142450 A | 9/2018 |
| WO | 2016076132 A1 | 5/2016 |
| WO | 2017110690 A1 | 6/2017 |

OTHER PUBLICATIONS

Extended European Search Report for European Application No. 19 864 315.7, dated May 24, 2022, 7 pages.
International Search Report and Written Opinion for International Application No. PCT/JP2019/037844, dated Nov. 26, 2019, 5 pages.

*Primary Examiner* — Helen Oi K Conley
(74) *Attorney, Agent, or Firm* — RatnerPrestia

(57) ABSTRACT

A fuel cell with high productivity, high power generation performance and high durability is described, along with a gas diffusion electrode base material having a microporous layer on one side of an electrically conductive porous base material, where the electrically conductive porous base material contains carbon fiber and resin carbide and has a density of 0.25 to 0.39 g/cm$^3$ and a pore mode diameter in a range of 30 to 50 μm. The microporous layer contains a carbonaceous powder and a fluororesin and has a surface roughness of 2.0 to 6.0 μm, a porosity of 50 to 95%, and a pore mode diameter of 0.050 to 0.100 μm.

15 Claims, No Drawings

GAS DIFFUSION ELECTRODE BASE MATERIAL AND PRODUCTION METHOD THEREFOR, AND SOLID POLYMER FUEL CELL

CROSS REFERENCE TO RELATED APPLICATIONS

This is the U.S. National Phase application of PCT/JP2019/037844, filed Sep. 26, 2019, which claims priority to Japanese Patent Application No. 2018-183743, filed Sep. 28, 2018, the disclosures of these applications being incorporated herein by reference in their entireties for all purposes.

FIELD OF THE INVENTION

The present invention relates to a gas diffusion electrode base material used in a fuel cell, and more particularly to a gas diffusion electrode base material suitable for, among fuel cells, a solid polymer fuel cell used as a power source for a fuel cell vehicle and the like.

BACKGROUND OF THE INVENTION

The solid polymer fuel cell is expected to be widely used as clean energy because of its high energy efficiency and the fact that it discharges only water.

A basic configuration of the solid polymer fuel cell includes a polymer electrolyte membrane, a catalyst layer formed on each side of the polymer electrolyte membrane, a gas diffusion electrode base material formed outside the catalyst layer, and two separators sandwiching them.

A fuel cell is a system for electrically extracting energy generated when hydrogen reacts with oxygen to produce water. Thus, under an increased electrical load, that is, under a large current taken out to the outside of the battery, a large amount of water (water vapor) is produced. The water vapor condenses into water droplets at low temperature to block pores of the gas diffusion electrode base material, and thus reduces the amount of gas (oxygen or hydrogen) supplied to the catalyst layer. If all the pores are finally blocked, power generation may stop (this phenomenon is called flooding).

As the gas diffusion electrode base material, specifically, an electrically conductive porous base material such as carbon felt, carbon paper, or carbon cloth made of carbon fibers is used; however, condensation of water vapor generates large water droplets and tends to cause flooding, since the fibers of the electrically conductive porous base material are coarsely woven. Thus, a layer (also referred to as a microporous layer) containing conductive fine particles, such as a carbonaceous powder, is sometimes provided on the electrically conductive porous base material.

The microporous layer is generally formed by drying and sintering ink (hereinafter referred to as MPL ink) in which a carbonaceous powder, fluororesin particles as a binder thereof, and a surfactant are dispersed in water. Here, since a melting point of the fluororesin is much higher than a drying temperature of the MPL ink, the carbonaceous powder largely moves and aggregates during drying to cause a crack, and even if the fluororesin melts and moves by sintering, the crack sometimes cannot be repaired.

The cracks formed in the microporous layer tend to be a starting point of aggregation of water vapor, so that flooding is likely to occur, and performance tends to be low. Since an electrolyte membrane swells and contracts depending on operating conditions, this causes cracks to expand and durability to decrease due to damage to the electrolyte membrane. In particular, when a process of applying a catalyst coating liquid on a microporous layer to form a catalyst layer is employed, the catalyst coating liquid cannot be uniformly applied.

Patent Document 1 discloses a technique for forming a gas diffusion electrode base material by changing a density of an electrically conductive porous base material.

Patent Document 2 discloses a technique for making an electrically conductive porous base material water-repellent, then heat-treating the base material at a high temperature of 300° C. or higher to increase water repellency of the electrically conductive porous base material, and then forming a microporous layer.

Patent Document 3 discloses a technique for reducing surface roughness by forming a microporous layer into a two-layer structure.

PATENT DOCUMENTS

Patent Document 1: Japanese Patent Laid-open Publication No. 2011-195374
Patent Document 2: Japanese Patent Laid-open Publication No. 2011-171182
Patent Document 3: Japanese Patent Laid-open Publication No. 2006-310201

SUMMARY OF THE INVENTION

The technique described in Patent Document 1 discloses a technique for improving gas diffusibility and power generation performance by lowering a density of an electrically conductive porous base material. However, since the electrically conductive porous base material contains pulp carbide, a pore mode diameter decreases, and there is a limit to the improvement of the power generation performance. In addition, there is a problem that impurities derived from pulp reduce durability of the fuel cell.

In the technique described in Patent Document 2, the electrically conductive porous base material is subjected to a water repellent processing and then heat-treated at a high temperature of 300° C. or higher to increase the water repellency of the electrically conductive porous base material, and then the MPL ink is applied. However, since immersion of the MPL ink into the electrically conductive porous base material is excessively suppressed, there are problems that the MPL ink is repelled so that surface roughness increases, adhesion at an interface between the microporous layer and electrically conductive porous base material is weak, and peeling tends to occur at the interface between the microporous layer and electrically conductive porous base material. In addition, since heat treatment at a high temperature is required before forming the microporous layer, the manufacturing cost is high.

The technique described in Patent Document 3 can reduce the surface roughness by forming the microporous layer into a two-layer structure, and the present invention does not exclude formation of the microporous layer into a two-layer structure. However, since it is necessary to apply the MPL ink twice, the manufacturing cost increases.

Thus, an object of the present invention is to provide a gas diffusion electrode base material having high productivity and improving power generation performance and durability when used in a fuel cell.

In order to solve the above problems, the present invention provides a gas diffusion electrode base material having a microporous layer on one side of the electrically conductive porous base material, the electrically conductive porous base material contains carbon fiber and resin carbide and has a density of 0.25 to 0.39 g/cm³ and a pore mode diameter in a range of 30 to 50 μm.

The microporous layer contains a carbonaceous powder and a fluororesin and has a surface roughness of 2.0 to 6.0 μm, a porosity of 50 to 95%, and a pore mode diameter of 0.050 to 0.100 μm.

The present invention further provides a production method for a gas diffusion electrode base material, including simultaneously adding a fluororesin and a water repellent processing additive different from the fluororesin to an electrically conductive porous base material and then applying an MPL ink in which a carbonaceous powder, fluororesin particles, and a surfactant are dispersed in water.

By using the gas diffusion electrode base material of the present invention, a fuel cell with high productivity, high power generation performance and high durability can be obtained.

DETAILED DESCRIPTION OF EMBODIMENTS OF THE INVENTION

The gas diffusion electrode base material of the present invention includes a microporous layer on at least one side of an electrically conductive porous base material.

Specific examples of the electrically conductive porous base material that is preferably used include porous base materials containing a carbon fiber, such as carbon fiber fabrics, carbon fiber papermaking materials, carbon fiber nonwoven fabrics, carbon felts, carbon papers and carbon cloths, and metal porous base materials such as foamed sintered metals, metal meshes and expanded metals. Among these, it is necessary to contain carbon fiber because of its excellent corrosion resistance, and it is preferable to use a porous base material containing carbon fiber, such as carbon felt, carbon paper, and carbon cloth. Further, it is necessary to contain a resin carbide because it is excellent in property of absorbing a change in dimension of an electrolyte membrane in a thickness direction, i.e. "spring property", and it is preferable to use a base material containing the resin carbide, which can be obtained by binding a carbon fiber papermaking body with the resin carbide, that is, a carbon paper.

The electrically conductive porous base material used for the gas diffusion electrode base material of the present invention has a density of 0.25 to 0.39 g/cm³. When the density of the electrically conductive porous base material is 0.25 g/cm³ or more, carbon fiber is easily bound by the resin carbide, and the electrical conductivity and strength of the electrically conductive porous base material are improved, which is preferable. Further, when the density of the electrically conductive porous base material is 0.25 g/cm³ or more, it is preferable because local short circuit caused by carbon fiber sticking into the electrolyte membrane inside a fuel cell is less likely to occur. For these reasons, the density of the electrically conductive porous base material is preferably 0.26 g/cm³ or more, and more preferably 0.28 g/cm³ or more. The density of the electrically conductive porous base material is still more preferably 0.30 g/cm³ or more. The density of the electrically conductive porous base material is preferably 0.39 g/cm³ or less because gas diffusibility of the electrically conductive porous base material is improved and power generation performance is improved. For these reasons, the density of the electrically conductive porous base material is preferably 0.37 g/cm³ or less, and more preferably 0.35 g/cm³ or less.

The density of the base material in the present invention is a value calculated from a mass measured in a 10 cm square and a thickness obtained by using a micrometer in a pressed state at a surface pressure of 0.15 MPa. For the thickness, an average value obtained by measuring thicknesses at 10 or more points within a range of a square with a side of 10 cm is used.

The electrically conductive porous base material used for the gas diffusion electrode base material of the present invention has a pore mode diameter of 30 to 50 μm. When the pore mode diameter of the electrically conductive porous base material is 30 μm or more, liquid water can easily escape from the electrically conductive porous base material, and the power generation performance at low temperature is improved. For these reasons, the pore mode diameter of the electrically conductive porous base material is more preferably 35 μm or more. When the pore mode diameter of the electrically conductive porous base material is 50 μm or less, immersion of an MPL ink is suppressed in a step of applying the microporous layer, and surface quality of the microporous layer is improved. For these reasons, the pore mode diameter of the electrically conductive porous base material is more preferably 45 μm or less.

In the case of a base material obtained by binding a carbon fiber papermaking body such as a carbon paper with a resin carbide, the pore mode diameter can be reduced by increasing a ratio of the resin carbide to carbon fiber, or the pore mode diameter can be increased by reducing the density of the electrically conductive porous base material while keeping the ratio of the resin carbide to the carbon fiber constant.

The pore mode diameter referred to in the present invention refers to a pore diameter of the highest peak in a pore diameter distribution (graph plotted with the horizontal axis as the pore diameter and the vertical axis as a Log differential pore volume) that can be measured by a mercury intrusion method. The Log differential pore volume is a pore volume in which a value obtained by dividing a difference pore volume dV by a logarithmic differential value d (Log D) of a pore diameter is plotted with respect to an average pore diameter of each section. The pore mode diameter of the electrically conductive porous base material used for the gas diffusion electrode base material means a peak position of 1 μm or more in the pore diameter distribution, and the pore mode diameter of the microporous layer means a peak position of less than 1 μm in the pore diameter distribution.

In the measurement of the pore mode diameter, a sample piece is cut out from the gas diffusion electrode base material, accurately weighed, and then placed in a measurement cell, mercury is injected under reduced pressure, and the pore mode diameter can be measured under the conditions shown below.

Measurement pressure range: 6 kPa (400 μm) to 414 MPa (30 nm)
Measurement cell mode: Pressure raising process in the above pressure range
Cell volume: 5 cm³
Surface tension of mercury: 485 dyn/cm
Mercury contact angle: 130°

As the measuring device, an Autopore 9520 manufactured by Shimadzu Corporation or an equivalent product thereof can be used.

In the present invention, from the viewpoint of enhancing gas diffusibility, it is preferable to reduce a thickness of an electrically conductive porous base material such as a carbon paper. In other words, the thickness of the electrically conductive porous base material such as a carbon paper is preferably 220 μm or less, more preferably 150 μm or less, and particularly preferably 120 μm or less. However, if the thickness is too small, mechanical strength becomes weak, so that the thickness is usually preferably 70 μm or more to facilitate handling in a manufacturing step.

It is also a preferable embodiment that the electrically conductive porous base material in the present invention is subjected to a water repellent processing for the purpose of improving water drainability. Since a fluororesin exhibits water repellency when heat-treated at a high temperature of 300° C. or higher, the electrically conductive porous base material for use in the present invention preferably contains a water-repellent resin such as a fluororesin. Examples of the water-repellent resin contained in the electrically conductive porous base material, i.e. the fluororesin contained in the electrically conductive porous base material include PTFE (polytetrafluoroethylene) (e.g. "Teflon®"), FEP (tetrafluoroethylene-hexafluoropropylene copolymer), PFA (perfluoroalkoxy fluoride resin), ETFE (ethylene tetrafluoro ethylene copolymer), PVDF (polyvinylidene difluoride) and PVF (polyvinyl fluoride), and PTFE or FEP, which exhibits high water repellency, is preferable. The amount of the water-repellent resin is not particularly limited, and the suitable amount of the water-repellent resin is 0.1% by mass or more and 20% by mass or less based on 100% by mass of the total of the electrically conductive porous base material. If the amount of the water-repellent resin is less than 0.1% by mass, the water repellency may not be sufficiently exhibited. If the amount of the water-repellent resin exceeds 20% by mass, the pores which serve as gas diffusion paths or water drainage paths may be blocked, or the electric resistance may be increased.

In the electrically conductive porous base material in the present invention, it is preferable that a water repellent processing additive different from the fluororesin be added at the same time as the fluororesin in the water repellent processing step. Preferable examples of the water repellent processing additive different from the fluororesin include a silicone-based water repellent processing additive, a paraffin-based water repellent processing additive, and a polymer compound (hydrocarbon-based water repellent processing additive) having a side chain consisting of a perfluoroalkyl group or a hydrocarbon group in a main chain of an acrylate polymer. Fluorine-free water repellent processing additives that do not emit perfluorooctanoic acid, which is known to impose a burden on the environment, are more preferable. The hydrocarbon-based water repellent processing additive preferably has 12 or more and 24 or less carbon atoms in the hydrocarbon group in the side chain and is more preferably a linear alkyl group.

In addition, the water repellent processing additive different from the fluororesin is thermally decomposed when heat-treated at a high temperature of 300° C. or higher, and a hydrophilic residue remains. Therefore, when the water repellent processing additive before the heat treatment is taken as 100%, the mass retention rate is preferably 50% or less, and more preferably 20% or less. In order to reduce a weight retention rate when the heat treatment is performed at a high temperature of 300° C. or higher, it is preferable that the water repellent processing additive different from the fluororesin not contain a blocked isocyanate-based cross-linking agent or a melamine resin.

Examples of hydrocarbon-based water repellent processing additives include "NEOSEED (trade name)" manufactured by Nicca Chemical Co., Ltd., "Paragium ECO (trade name)" manufactured by Ohara Paragium Chemical Co., Ltd., and "RACGUARD NOF (trade name)" manufactured by Rakuto Kasei Industrial Co., Ltd. Examples of silicone-based water repellent processing additives include "DRYPON 600E (trade name)" manufactured by Nicca Chemical Co., Ltd., and "Poron (trade name)" manufactured by Shin-Etsu Chemical Co., Ltd. Examples of wax-based water repellent processing additives include "TH-44 (trade name)" manufactured by Nicca Chemical Co., Ltd. and "Neolax (trade name)" manufactured by Takamatsu Oil & Fat Co., Ltd.

As described above, for example when the silicone-based water repellent processing additive is used, silicon may be contained in an electrically conductive porous base material surface opposite to a surface of the gas diffusion electrode base material having the microporous layer in the present invention. However, a silicon/carbon element ratio in this case is preferably 0.020 or more. When the silicon/carbon element ratio is 0.020 or more, the immersion of the MPL ink into the electrically conductive porous base material in the step of applying the microporous layer is suppressed, cracks in the microporous layer are reduced, and the surface roughness is reduced. Since the immersion of the MPL ink into the electrically conductive porous base material in the step of applying the microporous layer is suppressed, a porosity of the electrically conductive porous base material increases, gas diffusibility and water drainability increase, flooding can be further suppressed, and the power generation performance is improved. For these reasons, the silicon/carbon element ratio is more preferably 0.025 or more, and still more preferably 0.030 or more.

When the silicon/carbon element ratio is 0.050 or less, the water repellency of the electrically conductive porous base material does not become too high, and adhesion at an interface between the microporous layer and the electrically conductive porous base material becomes strong, which is preferable. When the silicon/carbon element ratio is 0.050 or less, hydrophilicity of the surface of the gas diffusion electrode base material decreases, so that the water drainability of the gas diffusion electrode base material becomes high, flooding can be further suppressed, and the power generation performance is improved. For these reasons, the silicon/carbon element ratio is more preferably 0.045 or less, and still more preferably 0.040 or less.

The gas diffusion electrode base material in which the silicon/carbon element ratio is 0.020 to 0.050 can be obtained by adding a silicone-based water repellent processing additive having a silicon atom in a molecular structure at the same time as the fluororesin in a step of water repellent processing of the electrically conductive porous base material to be described below. The silicon/carbon element ratio can be increased by increasing an attached amount of the water repellent processing additive having a silicon atom in the molecular structure.

Here, the silicon/carbon element ratio can be determined from an average value obtained by performing scanning electron microscope (SEM)-EDX measurement on the electrically conductive porous base material surface opposite to the surface of the gas diffusion electrode base material having the microporous layer, under the conditions of an acceleration voltage of 20 kV and a magnification of 2,000 times and measuring 10 or more points.

An oxygen/carbon element ratio on the electrically conductive porous base material surface opposite to the surface of the gas diffusion electrode base material having the microporous layer in the present invention is preferably 0.005 or more. When the oxygen/carbon element ratio is 0.005 or more, it shows that the immersion of the MPL ink into the electrically conductive porous base material in the step of applying the microporous layer is suppressed, cracks in the microporous layer are reduced, and the surface roughness is reduced. Since the immersion of the MPL ink into the electrically conductive porous base material in the step of applying the microporous layer is suppressed, a porosity of the electrically conductive porous base material increases, gas diffusibility and water drainability increase, flooding can be further suppressed, and the power generation performance is improved. For these reasons, the oxygen/carbon element ratio is more preferably 0.006 or more, and still more preferably 0.007 or more.

When the oxygen/carbon element ratio is 0.015 or less, the water repellency of the electrically conductive porous base material does not become too high, and the adhesion at the interface between the microporous layer and the electrically conductive porous base material becomes strong, which is preferable. When the oxygen/carbon element ratio is 0.015 or less, the hydrophilicity of the surface of the gas diffusion electrode base material decreases, so that the water drainability of the gas diffusion electrode base material becomes high, flooding can be further suppressed, and the power generation performance is improved. For these reasons, the oxygen/carbon element ratio is more preferably 0.013 or less, and still more preferably 0.011 or less.

The gas diffusion electrode base material in which the oxygen/carbon element ratio is 0.005 to 0.015 can be obtained by adding a water repellent processing additive having an oxygen atom in a molecular structure at the same time as the fluororesin in the step of water repellent processing of the electrically conductive porous base material to be described below. The oxygen/carbon element ratio can be increased by increasing an attached amount of the water repellent processing additive having an oxygen atom in the molecular structure.

Here, the oxygen/carbon element ratio can be determined from an average value obtained by performing scanning electron microscope (SEM)-EDX measurement on the electrically conductive porous base material surface opposite to the surface of the gas diffusion electrode base material having the microporous layer, under the conditions of an acceleration voltage of 20 kV and a magnification of 2,000 times and measuring 10 or more points.

A cumulative pore volume per 1 $cm^2$ in the pore mode diameter of 30 to 50 μm in the gas diffusion electrode base material in the present invention is preferably in a range of 1.5 to 4.0 μL/$cm^2$. When the cumulative pore volume is 1.5 μL/$cm^2$ or more, the number of pores of the electrically conductive porous base material increases, the gas diffusibility and the water drainability become high, flooding can be further suppressed, and the power generation performance is improved. For these reasons, the cumulative pore volume is more preferably 1.7 μL/$cm^2$ or more, and still more preferably 2.0 μL/$cm^2$ or more. When the cumulative pore volume is 4.0 μL/$cm^2$ or less, the thickness of the electrically conductive porous base material tends to be within a suitable range, the gas diffusibility and the water drainability become high, flooding can be further suppressed, and the power generation performance is improved. For these reasons, the cumulative pore volume is more preferably 3.5 μL/$cm^2$ or less, and still more preferably 3.0 μL/$cm^2$ or less.

The gas diffusion electrode base material having a cumulative pore volume of 1.5 to 4.0 μL/$cm^2$ can be obtained by controlling the density and thickness of the electrically conductive porous base material and the immersion of the MPL ink in the step of applying the microporous layer. For example, by reducing the density of the electrically conductive porous base material, by increasing the thickness of the electrically conductive porous base material, or by reducing the immersion of the MPL ink in the step of applying the microporous layer, a gas diffusion electrode base material having a large cumulative pore volume can be obtained.

Here, the cumulative pore volume is obtained by dividing the pore volume obtained for each pore diameter by the mercury intrusion method by a basis weight of the gas diffusion electrode base material and integrating within the range of the pore diameter of 30 to 50 μm. Here, the basis weight of the gas diffusion electrode base material is obtained by dividing the mass of the gas diffusion electrode base material weighed using an electronic balance by an area of the gas diffusion electrode base material. In the measurement of the cumulative pore volume, three sample pieces of about 12 mm×20 mm square are cut out from the gas diffusion electrode base material, accurately weighed, and then placed in a measurement cell so as not to overlap each other, mercury is injected under reduced pressure, and the cumulative pore volume can be measured under the conditions shown below.

Measurement pressure range: 6 kPa (400 μm) to 414 MPa (30 nm)

Measurement cell mode: Pressure raising process in the above pressure range

Cell volume: 5 $cm^3$

Surface tension of mercury: 485 dyn/cm

Mercury contact angle: 130°

As the measuring device, an Autopore 9520 manufactured by Shimadzu Corporation or an equivalent product thereof can be used.

A coverage (strike-through rate) by a carbonaceous powder on the electrically conductive porous base material surface opposite to the surface of the gas diffusion electrode base material having the microporous layer in the present invention is preferably less than 10%. When the strike-through rate is less than 10%, it shows that the immersion of the MPL ink into the electrically conductive porous base material in the step of applying the microporous layer is suppressed, cracks in the microporous layer are reduced, and the surface roughness is reduced. Since the immersion of the MPL ink into the electrically conductive porous base material in the step of applying the microporous layer is suppressed, a porosity of the electrically conductive porous base material increases, gas diffusibility and water drainability increase, flooding can be further suppressed, and the power generation performance is improved. For these reasons, the strike-through rate is more preferably less than 8%, and still more preferably less than 6%. A smaller strike-through rate is more preferable; however, the strike-through rate is generally 0.1% or more. The gas diffusion electrode base material having a strike-through rate of less than 10% is obtained, for example, by increasing the density of the electrically conductive porous base material in a production method described below, increasing the water repellency of the electrically conductive porous base material to suppress the immersion of the MPL ink into the electrically conductive porous base material in the step of applying the microporous layer, or reducing the pore mode diameter of the electrically conductive porous base material.

Here, the strike-through rate can be obtained, for example, according to the following procedure. First, a photograph of the electrically conductive porous base material surface opposite to the surface of the gas diffusion electrode base material having the microporous layer is taken at an observation magnification of 200 times. As a scanning electron microscope, S-5500 manufactured by Hitachi, Ltd. or an equivalent product thereof can be used. Photographs are taken by randomly selecting different parts from the gas diffusion electrode base material until 10 images of the surface are obtained. Next, a portion covered with the carbonaceous powder is cut out from the obtained image and binarized. There are various binarization methods, and when it is possible to clearly distinguish between a portion covered with the carbonaceous powder and a portion not covered with the carbonaceous powder, a method of visually distinguishing each portion may be adopted. In the present invention, it is preferable to adopt a method using image processing software or the like. Here, as the image processing software, Adobe Photoshop® manufactured by Adobe Systems Incorporated or JTrim can be used. Next, the processing method when JTrim v1.53c is used will be described. It is preferable to obtain a binarized image by performing normalization processing on each image and then performing black and white conversion at a threshold value of 128. In each of the obtained binarized images, a ratio (%) of an area of the portion covered with the carbonaceous powder to a photographed area is calculated, and an average value of the ratios is calculated and used as the strike-through rate. When the ratio of the area is determined with image processing software, it is preferable to count and calculate the number of pixels.

In-plane gas diffusibility of the gas diffusion electrode base material in the present invention is preferably in a range of 40 to 80 cc/min. When the in-plane gas diffusibility is 40 cc/min or more, a gas can be sufficiently diffused in an in-plane direction inside the fuel cell, so that the power generation performance is improved. For these reasons, the in-plane gas diffusibility is more preferably 50 cc/min or more, and still more preferably 60 cc/min or more. When the in-plane gas diffusibility is 80 cc/min or less, the amount of gas discharged without being used inside the fuel cell is reduced, which is preferable. For these reasons, the in-plane gas diffusibility is more preferably 75 cc/min or less, and still more preferably 70 cc/min or less.

The gas diffusion electrode base material having an in-plane gas diffusibility of 40 to 80 cc/min can be obtained by controlling the density and thickness of the gas diffusion electrode base material and the immersion of the MPL ink in the step of applying the microporous layer. Here, by reducing the density of the gas diffusion electrode base material, by increasing the thickness of the gas diffusion electrode base material, or by reducing the immersion of the MPL ink in the step of applying the microporous layer, a gas diffusion electrode base material having a large in-plane gas diffusibility can be obtained.

Here, the in-plane gas diffusibility can be obtained by flowing a gas at a constant pressure through a cross-section (through-thickness cross-section) perpendicular to the surface of the gas diffusion electrode base material and measuring a flow rate (cc/min) of the gas. Nitrogen is used as the gas species, the measurement pressure is 5 kPa with respect to an atmospheric pressure, a measured area is 8 mm in length and 24 mm in width, and the measurement can be performed by flowing a gas from a horizontal direction of the base material. As the measuring device, a steam gas/water vapor permeation diffusion evaluation device MVDP-200C manufactured by Seika Corporation or an equivalent product thereof can be used.

<Microporous Layer>

The microporous layer in the present invention contains a carbonaceous powder and a fluororesin, and the surface roughness of the microporous layer is 2.0 to 6.0 µm. The porosity of the microporous layer is 50 to 95%, and the pore mode diameter is 0.050 to 0.100 µm.

When the porosity of the microporous layer is 50% or more, the gas diffusibility and the water drainability are high, flooding can be further suppressed, and the power generation performance is improved, which is preferable. For these reasons, the porosity of the microporous layer is more preferably 60% or more, still more preferably 70% or more. When the porosity of the microporous layer is 95% or less, the electrical conductivity is improved, which is preferable. For these reasons, the porosity of the microporous layer is more preferably 90% or less, still more preferably 85% or less.

The microporous layer having a porosity of 50 to 95% is obtained by controlling a blending amount of the carbonaceous powder based on fluororesin of the microporous layer and other materials, and the type of the carbonaceous powder in the production method described below. Here, a microporous layer with a high porosity is easily obtained by increasing the blending amount of the carbonaceous powder based on the fluororesin and other materials, and a microporous layer with a low porosity is obtained by decreasing the blending amount of the carbonaceous powder based on other materials including the fluororesin.

Here, the porosity of the microporous layer is determined by taking a photograph of a sample for cross-section observation, prepared by use of an ion milling apparatus, at a magnification of 1,000 times or more with a microscope such as a scanning electron microscope, measuring an area of the pore part, and then calculating an area ratio of the pore part to the observed area. As a scanning electron microscope, S-5500 manufactured by Hitachi, Ltd. or an equivalent product thereof can be used.

When the surface roughness of the microporous layer is 6.0 µm or less, the electrolyte membrane is less likely to be damaged, and durability of the fuel cell can be improved. The "surface" in the surface roughness referred to here refers to a surface opposite to a surface in contact with the electrically conductive porous base material, and for these reasons in the gas diffusion electrode base material, the surface roughness of the microporous layer is more preferably 5.5 µm or less, and still more preferably 5.0 µm or less. A smaller surface roughness is more preferable; however, the surface roughness is generally 2.0 µm or more. The microporous layer having a surface roughness of 2.0 to 6.0 µm is obtained, for example, by increasing the density of the electrically conductive porous base material in the production method described below, increasing the water repellency of the electrically conductive porous base material to suppress the immersion of the MPL ink in the step of applying the microporous layer, reducing the pore mode diameter of the electrically conductive porous base material, or reducing the strike-through rate of the gas diffusion electrode base material.

Here, the surface roughness of the microporous layer can be determined by using a non-contact roughness measuring device. A shape measuring machine VR-3200 manufactured by KEYENCE CORPORATION can be used as the device, and the microporous layer is fixed to the device so that there are no lifting and wrinkling with the microporous layer facing up, and the surface roughness can be measured with a field of view of 48 mm$^2$. The measurement is performed at any 10 points on the surface of the microporous layer, and an average value of an arithmetic mean roughness Ra of these 10 points is defined as the surface roughness.

When the pore mode diameter of the microporous layer is 0.050 µm or more, the gas diffusibility of the microporous layer is high, and the power generation performance of the gas diffusion electrode base material is high, which is preferable. For these reasons, the pore mode diameter of the microporous layer is more preferably 0.070 µm or more. When the pore mode diameter of the microporous layer is 0.100 µm or less, the microporous layer is not liable to collapse, and short-circuit resistance is improved, which is preferable. Furthermore, when the pore mode diameter of the microporous layer is 0.100 µm or less, flooding is unlikely to occur because a starting point for aggregation of water vapor hardly occurs. When the process of applying a catalyst coating liquid on a microporous layer to form a catalyst layer is employed, the catalyst coating liquid hardly permeates the microporous layer and can be applied uniformly. For these reasons, the pore mode diameter of the microporous layer is more preferably 0.090 µm or less. The microporous layer having a pore mode diameter of 0.050 to 0.100 µm can be controlled by changing the primary particle size of the carbonaceous powder contained in the microporous layer. By increasing the primary particle size of the carbonaceous powder, the pore mode diameter of the microporous layer is increased.

Here, the pore mode diameter of the microporous layer is obtained by determining the pore mode diameter in a range of 0.03 µm or more and less than 1 µm by the same method as the method for measuring the pore mode diameter of the electrically conductive porous base material.

The number of holes having a diameter of 150 µm or more on the surface of the microporous layer in the present invention is preferably in a range of 0.001 to 0.050 holes/cm$^2$. When the number of holes is 0.050 holes/cm$^2$ or less, in the case of adopting the process of applying the catalyst coating liquid on the microporous layer to form the catalyst layer, the catalyst coating liquid hardly permeates the microporous layer and can be applied uniformly. For these reasons, the number of holes is more preferably 0.040/cm$^2$ or less, and still more preferably 0.030/cm$^2$ or less. A smaller number of holes is more preferable; however, the number of holes is generally 0.001 holes/cm$^2$ or more. The microporous layer in which the number of holes is 0.001 to 0.050 holes/cm$^2$ is obtained by increasing the density of the electrically conductive porous base material in the production method described below, increasing the water repellency of the electrically conductive porous base material to suppress the immersion of the MPL ink in the step of applying the microporous layer, reducing the pore mode diameter of the electrically conductive porous base material, or reducing the strike-through rate of the gas diffusion electrode base material.

Here, the number of holes can be obtained by making observation in five or more visual fields in which a region larger than a 1 mm square with a surface of the microporous layer magnified 100 or more times with an optical microscope is selected arbitrarily, measuring the number of holes having a diameter of 150 µm or more, and performing division by a measured area. If the shape of the hole is not a perfect circle, a diameter of a perfect circle having the same area as the area of the hole is defined as the diameter of the hole. As the optical microscope, for example, a digital microscope M205C (manufactured by Leica Microsystems) can be used.

A DBP absorption value of the carbonaceous powder contained in the microporous layer in the present invention is preferably in a range of 156 to 220 mL/100 g. When the DBP absorption value is 156 mL/100 g or more, the viscosity of an MPL coating liquid becomes high, since the immersion of the MPL ink into the electrically conductive porous base material in the step of applying the microporous layer is suppressed, the porosity of the electrically conductive porous base material increases, the gas diffusibility and the water drainability increase, flooding can be further suppressed, and the power generation performance is improved. For these reasons, the DBP absorption value is more preferably 160 mL/100 g or more, and still more preferably 170 mL/100 g or more. When the DBP absorption value is 220 mL/100 g or less, dispersibility of the carbonaceous powder is improved, and the MPL ink has high storage stability. Furthermore, when the DBP absorption value is 220 mL/100 g or less, the surface roughness of the microporous layer becomes small because a secondary particle size of the carbonaceous powder is small. For these reasons, the DBP absorption value is more preferably 210 mL/100 g or less, and still more preferably 200 mL/100 g or less.

Here, the DBP absorption value can be increased by increasing a collision rate of particles as a raw material during the production of the carbonaceous powder. The DBP absorption value of the carbonaceous powder contained in the MPL coating liquid can be calculated in accordance with JIS K6217-4 (2008 Revised version).

The primary particle size of the carbonaceous powder contained in the microporous layer in the present invention is preferably in a range of 20 to 39 nm. When the primary particle size is 20 nm or more, the pore mode diameter of the microporous layer becomes large, the gas diffusibility of the microporous layer is high, and the power generation performance of the gas diffusion electrode base material is high. For these reasons, the primary particle size is more preferably 23 nm or more, and still more preferably 26 nm or more. When the primary particle size is 39 nm or less, the pore mode diameter of the microporous layer becomes small, the microporous layer is not liable to collapse, and the short-circuit resistance is improved. When the pore mode diameter of the microporous layer becomes small, flooding is unlikely to occur because the starting point for aggregation of water vapor hardly occurs. When the process of applying a catalyst coating liquid on a microporous layer to form a catalyst layer is employed, the catalyst coating liquid hardly permeates the microporous layer and can be applied uniformly. For these reasons, the primary particle size is more preferably 37 nm or less, and still more preferably 35 nm or less.

Here, the primary particle size is obtained by taking a photograph of a sample for cross-section observation, prepared by use of an ion milling apparatus, at a magnification of 200,000 times or more with a microscope such as a scanning electron microscope, measuring diameters of 100 primary particles selected randomly, and averaging the diameters. As the ion milling device, for example, IM4000 (manufactured by Hitachi High-Technologies Corporation) can be used.

The microporous layer in the present invention preferably contains a fibrous carbide having a fiber diameter of 5 nm or more and 10 µm or less and an aspect ratio of 10 or more. The oxygen/carbon element ratio of the fibrous carbide is preferably 0.020 or more. When the oxygen/carbon element ratio of the fibrous carbide is 0.020 or more, crystallinity of the fibrous carbide is low, and the fibrous carbide may be flexible. Therefore, even if the aspect ratio is 10 or more, the fibrous carbide may hardly pierce into the electrolyte membrane when used for the solid polymer fuel cell. The aspect ratio of the fibrous carbide is preferably 10 or more, more preferably 100 or more, because an increase in the aspect ratio can be expected to improve a reinforcing effect. For this reason, the shape of the fibrous carbide is preferably fibrous, a smaller fiber diameter is better, and the fiber diameter is preferably 1 μm or less, more preferably 0.1 μm or less. The fiber diameter of the fibrous carbide is preferably 5 nm or more and 100 nm or less, because the fibrous carbide hardly pierces into the electrolyte membrane. The fiber diameter of the fibrous carbide is preferably 500 nm or more and 10 μm or less, because an effect of suppressing cracks can be easily obtained. The fiber diameter may be in a range between any two of the above upper and lower limits. The cross section of the microporous layer of the present invention preferably contains the fibrous carbides in an amount of 1,000/mm$^2$ or more. When the fibrous carbide is contained in an amount of 1,000/mm$^2$ or more, the effect of suppressing cracks is easily obtained. The microporous layer of the present invention preferably contains carbon black, fluororesin, and the fibrous carbide. When carbon black, fluororesin, and the fibrous carbide are contained, a water-repellent structure can be formed uniformly, and the power generation performance and durability are improved. As such a fibrous carbide, for example, a fibrous carbide obtained by heat-treating an acrylic resin, a styrene resin, cellulose, starch, a polylactic acid resin, or the like can be used.

The microporous layer in the present invention is preferably substantially free from cracks. When there is no crack, flooding is unlikely to occur because a starting point for aggregation of water vapor hardly occurs. When an electrolyte membrane swells and contracts depending on operating conditions, it is easy to suppress deformation in a plane direction. In addition, when the process of applying a catalyst coating liquid on a microporous layer to form a catalyst layer is employed, the catalyst coating liquid can be uniformly applied. A microporous layer "substantially free from cracks" in the present invention refers to a microporous layer of the level where cracks cannot be visually clearly recognized. In this microporous layer, for example, observation is made in five or more visual fields in which a region larger than a 1 mm square with a surface of the microporous layer magnified 100 or more times under an optical microscope is selected arbitrarily, and when the number of cracks having a length of 100 μm or more is measured, the number converted per cm$^2$ is 50/cm$^2$ or less. The number is preferably 15/cm$^2$ or less, more preferably 5/cm$^2$ or less. As the optical microscope, for example, a digital microscope M205C (manufactured by Leica Microsystems) can be used.

The microporous layer in the present invention preferably has a thickness of 100 μm or less. If the thickness of the microporous layer exceeds 100 μm, the diffusivity (permeability or water drainability) of gas or water of the gas diffusion electrode itself may be reduced, or electrical resistance may be increased. The thickness of the microporous layer is preferably 80 μm or less, more preferably 40 μm or less, from the viewpoint of enhancing permeability and water drainability, or reducing electrical resistance, and the thickness of the microporous layer is preferably 15 μm or more in order to cover roughness of the electrically conductive porous base material, in consideration of porosity, pore size and water repellency of a general electrically conductive porous base material.

Here, the thickness of the microporous layer refers to a value calculated by observing a cross section and is obtained by, for example, a method of cutting the microporous layer or a gas diffusion electrode base material, stacked with the microporous layer, in a thickness direction by using an ion milling device, observing the perpendicular cross section (through-thickness cross-section) with SEM, and calculating the thickness from the SEM image. As the ion milling device, for example, IM4000 (manufactured by Hitachi High-Technologies Corporation) can be used.

<Carbonaceous Powder>

In the present invention, a carbonaceous powder constituting the microporous layer preferably has an aspect ratio of less than 20. When the aspect ratio is 20 or more, cracks are unlikely to occur during drying and sintering because the conductive materials are more easily hooked on each other as compared to a case where the aspect ratio is less than 20, but more than that, fibrous carbon having an aspect ratio of 20 or more is likely to pierce into an electrolyte membrane, which may cause local short circuit. When the fibrous carbon having an aspect ratio of 20 or more is used, a pore size in the microporous layer tends to be large as compared to that in the case of using the same volume of the particle-shaped carbonaceous powder. When the process of applying a catalyst coating liquid on the microporous layer to form a catalyst layer is employed, the catalyst coating liquid may not be able to be applied uniformly. For these reasons, the aspect ratio is more preferably 15 or less, still more preferably 10 or less, and particularly preferably 2 or less. As such a carbonaceous powder, it is possible to select a material having conductivity, such as carbon black, carbon nanotubes, carbon nanofibers, chopped carbon fibers, graphene and graphite, and carbon black is suitably used in terms of small aspect ratio, price, reliability in the aspect of health, and product quality stability. Acetylene black is suitably used from the viewpoint that it contains slight amount of impurities and thus hardly lowers the activity of the catalyst. When the cross section is observed under a scanning electron microscope, if fibrous carbon having an aspect ratio of 20 or more cannot be confirmed in an arbitrarily selected visual field exceeding a 5 μm square, it is judged that the fibrous carbon having an aspect ratio of 20 or more is not contained, and when the fibrous carbon having an aspect ratio of 20 or more can be confirmed in any observation visual field, it is judged that the fibrous carbon having an aspect ratio of 20 or more is contained.

The aspect ratio in the present invention means an average length/average diameter when the carbonaceous powder is fibrous carbon. The average length is an average value determined by taking a photograph at a magnification of 1,000 or more, with a microscope such as a scanning electron microscope or a transmission electron microscope, randomly selecting 10 different fibrous carbons, and measuring their lengths. The average diameter is an average value of 10 fibrous carbons determined by taking a photograph at a magnification of 10,000 or more, with a microscope such as a scanning electron microscope or a transmission electron microscope, randomly selecting 10 different fibrous carbons, measuring a length (width) in a direction perpendicular to a fiber axis direction on the photograph every 0.5 μm length in the fiber axis direction, and taking the average value as its diameter. When the carbonaceous powder is a plate-like material, it means average particle size/average thickness. The average particle size is a 50% cumulative diameter on a volume basis determined by measuring by use of a laser diffraction particle size analyzer. The average thickness is an average value determined by taking a photograph at a magnification of 10,000 times or more, with a microscope such as a scanning electron microscope or a transmission electron microscope, randomly selecting 10 different objects, and measuring their thicknesses. In the case of carbon black, the thickness means minimum circumscribed circle diameter/maximum inscribed circle diameter of primary particles. The minimum circumscribed circle diameter and the maximum inscribed circle diameter are average values determined by taking a photograph at a magnification of 200,000 times or more, with a microscope such as a scanning electron microscope or a transmission electron microscope, randomly selecting 100 different carbon blacks, and measuring their sizes. As such a scanning electron microscope, for example, S-5500 (manufactured by Hitachi, Ltd.) can be used. In the present invention, those having an aspect ratio exceeding 20 can be uniformly treated as >20.

<Water-Repellent Substance>

The microporous layer of the present invention preferably contains a water-repellent substance including a fluororesin for a binder function for bonding the above-described carbonaceous powders to each other, suppression of aggregation of water vapor, water drainability, moisture retention, and thermal conductivity. Examples of the fluororesin contained in the microporous layer include polymeric materials such as a polytetrafluoroethylene (PTFE), a tetrafluoroethylene-hexafluoropropylene copolymer (FEP), a tetrafluoroethylene-perfluoroalkylvinylether copolymer (PFA), and an ethylene tetrafluoro ethylene copolymer (ETFE).

In the present invention, the above-described water-repellent substance preferably has at 380° C. a melt viscosity of $10^9$ Pa·s or less, more preferably $10^7$ Pa·s or less, still more preferably $10^3$ Pa·s or less. This is because the polymeric material has a low melt viscosity, whereby a rate of wetting and spreading on a carbon fiber surface during a sintering step is high, so that excellent water repellency can be obtained. This makes it easier to suppress the aggregation of water vapor, and, when the process of applying a catalyst coating liquid on the microporous layer to form a catalyst layer is employed, the catalyst coating liquid can be uniformly applied. Such a water-repellent substance can be controlled by a molecular weight and a type of a compound, and, for example, FEP is a preferable embodiment.

<Gas Diffusion Electrode Base Material>

Preferable examples of the electrically conductive porous base material of the present invention include porous base materials containing carbon fibers, such as a carbon fiber woven fabric, a carbon fiber papermaking material, a carbon fiber nonwoven fabric, carbon felt, carbon paper, and carbon cloth, and metal porous base materials such as a foamed sintered metal, a metal mesh, and an expanded metal. In particular, it is necessary to contain a carbon fiber because it is excellent in corrosion resistance, and a porous base material including the carbon fiber, such as a carbon felt, a carbon paper or a carbon cloth, is preferably used. Further, it is necessary to contain a resin carbide because it is excellent in property of absorbing a change in dimension of an electrolyte membrane in a thickness direction, i.e. "spring property", and a base material containing the resin carbide obtained by binding a carbon fiber papermaking material with the resin carbide, i.e. a carbon paper is preferably used.

In the present invention, from the viewpoint of enhancing gas diffusibility, it is preferable to reduce a thickness of an electrically conductive porous base material such as a carbon paper. In other words, the thickness of the electrically conductive porous base material such as a carbon paper is preferably 220 µm or less, more preferably 150 µm or less, particularly preferably 120 µm or less. However, if the thickness is too small, mechanical strength becomes weak, so that the thickness is usually preferably 70 µm or more to facilitate handling in a production step.

<Fuel Cell>

A unit cell of the solid polymer fuel cell is typically constituted of a polymer electrolyte membrane, a catalyst layer formed on each side of the polymer electrolyte membrane, a gas diffusion electrode base material formed outside the catalyst layer, and two separators sandwiching them. The microporous layer of the present invention is usually disposed on a surface in contact with the catalyst layer as a part of the gas diffusion electrode base material or the gas diffusion electrode base material itself.

<Production Method for Gas Diffusion Electrode Base Material>

As a preferred production method for the gas diffusion electrode base material of the present invention, a method can be given in which after an electrically conductive porous base material such as a carbon paper is subjected to water repellent processing by simultaneously adding a fluororesin and a water repellent processing additive different from the fluororesin, the MPL ink is applied and dried, and then heat-treated at a temperature higher than the above drying temperature to produce the gas diffusion electrode base material.

As a method for subjecting the electrically conductive porous base material to the water repellent processing, not only a treatment technique in which a water repellent processing additive is mixed with a dispersion containing a fluororesin and the electrically conductive porous base material is immersed in the mixture, but also a coating technique in which a fluororesin and a water repellent processing additive are applied to the electrically conductive porous base material by die coating, spray coating or the like is applicable. If necessary, a drying process, and a sintering process may be added after the water repellent processing. However, since the immersion of components of the microporous layer may be excessively suppressed, it is preferable to perform sintering after formation of the microporous layer.

As a preferable method of forming a microporous layer, there is a method of applying the MPL ink by screen printing, rotary screen printing, spraying, intaglio printing, gravure printing, die coating, bar coating, blade coating, knife coating, or the like.

In the present invention, it is preferable to include a crack suppressing material (a material that becomes fibrous carbide after heat treatment) having an aspect ratio of 10 or more in addition to the carbonaceous powder.

The crack suppressing material having an aspect ratio of 10 or more according to the present invention is decomposed and removed by heat treatment at a temperature higher than a drying temperature described below, and functions as a crack suppressing material that enters a carbonaceous powder during drying and provides a crack suppressing effect. Since the crack suppressing material is decomposed and removed in a subsequent step, there is no problem such as piercing into an electrolyte membrane, and a water repellent function of the water-repellent substance is not hindered. Here, "temperature higher than the drying temperature" refers to a temperature higher than the highest temperature reached during drying. The "temperature higher than the drying temperature" is preferably higher than the drying temperature by 50° C. or more.

The content of the crack suppressing material according to the present invention having an aspect ratio of 10 or more in the MPL ink is preferably 50% by mass or less, more preferably 30% by mass or less, still more preferably 15% by mass or less with respect to the mass of the carbonaceous powder. This is because it is possible to reduce a risk that an amount of the crack suppressing material that cannot be completely decomposed and removed by heat treatment pierces into the electrolyte membrane. The above ratio is preferably 0.5% by mass or more, because the effect of suppressing cracks is easily obtained, and the ratio is more preferably 1% by mass or more, still more preferably 3% by mass or more.

The aspect ratio of the crack suppressing material according to the present invention is preferably 50 or more, more preferably 100 or more, because an increase in the aspect ratio can be expected to improve a reinforcing effect. For this reason, the shape of the crack suppressing material is preferably fibrous. A smaller fiber diameter is better from the viewpoint of dispersibility, uniformity, and surface smoothness after decomposition and removal, and, for example, the fiber diameter is preferably 1 μm or less, more preferably 0.1 μm or less.

The MPL ink according to the present invention may contain a dispersion medium such as water or an organic solvent, or may contain a dispersion aid such as a surfactant. A concentration of the carbonaceous powder in the MPL ink is preferably 5% by mass or more from the viewpoint of productivity. Water is preferred as the dispersion medium, and a nonionic surfactant is more preferably used as the dispersion aid.

It is preferable that the crack suppressing material according to the present invention have heat resistance at 150° C. and be decomposed and removed at 420° C. This is because a temperature at which the MPL ink is dried is usually 70 to 150° C. if the dispersion medium is water, and a usual water-repellent substance (for example, fluororesin) is decomposed and removed at a temperature of 420° C. or lower, as a temperature at which the water-repellent substance does not deteriorate or is not decomposed and removed. As a raw material of such a crack suppressing material, for example, an acrylic resin, a styrene resin, cellulose, starch, a polylactic acid resin, or the like can be used. In the present invention, the decomposition removal is preferably reduced to 50% by weight or less, more preferably to 30% by weight or less.

After applying and drying the MPL ink on the electrically conductive porous base material, the crack suppressing material is decomposed and removed. This step may be performed in the same manner as the drying step. That is, this step may be performed by directly increasing the temperature from the temperature during drying, or may be performed in another step. It is preferable that the crack suppressing material be decomposed and removed at a temperature at which the water-repellent substance is not decomposed, and a temperature at which a water repellent is melted and uniformly adhered, and, in addition, it is preferable that the dispersion aid be decomposed and removed. For this reason, heating to 300 to 400° C. in air is preferred, and heating to 360 to 400° C. is a more preferable embodiment.

<Method for Manufacturing Fuel Cell>

The method for manufacturing a fuel cell using the microporous layer of the present invention has two preferable embodiments. As one of the preferable embodiments, a catalyst layer formed on a film is transferred to the polymer electrolyte membrane to produce a polymer electrolyte membrane with the catalyst layer, and the produced polymer electrolyte membrane is sandwiched by a gas diffusion electrode base material with a microporous layer formed on one surface to manufacture a fuel cell. In this embodiment (referred to as the CCM method in the present invention), the catalyst layer can be formed smoothly. As the other preferable embodiment (referred to as the GDE method in the present invention), a catalyst coating liquid is applied on a gas diffusion electrode base material with a microporous layer formed on one surface to produce a gas diffusion electrode base material with the catalyst layer, and a polymer electrolyte membrane is sandwiched therebetween to produce a fuel cell. This embodiment is excellent in productivity, because the transfer step can be omitted.

EXAMPLES

Hereinafter, the present invention will be concretely described by way of examples.

<Evaluation>

A. Pore mode diameter, cumulative pore volume

Measurement was performed using Autopore 9520 manufactured by Shimadzu Corporation, and calculation was performed assuming that a surface tension σ of mercury was 485 dyn/cm and the contact angle between mercury and the microporous layer was 130°.

B. Silicon/carbon element ratio, oxygen/carbon element ratio

The silicon/carbon element ratio was determined from the average value obtained by performing scanning electron microscope (SEM)-EDX measurement on the electrically conductive porous base material surface opposite to the surface of the gas diffusion electrode base material having the microporous layer, under the conditions of an acceleration voltage of 20 kV and a magnification of 2,000 times and measuring 10 or more points.

C. Porosity of Microporous Layer

The porosity of the microporous layer was determined by taking a photograph of a sample for cross-section observation, prepared by use of an ion milling apparatus, at a magnification of 1,000 times or more by S-5500 manufactured by Hitachi, Ltd., measuring the area of the pore part, and then calculating the area ratio of the pore part to the observed area.

D. Surface Roughness of Microporous Layer

Using the shape measuring machine VR-3200 manufactured by KEYENCE CORPORATION, the microporous layer was fixed to the device so that there were no lifting and wrinkling with the microporous layer facing up, and the surface roughness was measured with a field of view of 48 mm$^2$ at any 10 points on the surface of the microporous layer. The average value of the arithmetic mean roughness Ra of the 10 points was defined as the surface roughness of the microporous layer.

E. Number of Holes in Microporous Layer

The surface of the microporous layer was observed at 5 points in a 5 mm square field of view using a digital microscope M205C (manufactured by Leica Microsystems), and the number of holes having a diameter of 150 μm or more was measured, divided by the measured area, and defined as the number of holes of the microporous layer.

F. Analysis of Fibrous Carbide

The oxygen/carbon element ratio of the fibrous carbide was determined as follows. A sample for observation of a cross section in the thickness direction of the gas diffusion electrode base material produced by the ion milling device was used, and scanning electron microscope (SEM)-EDX measurement was performed under the conditions of an acceleration voltage of 10 kV and a magnification of 100,000 times to obtain the oxygen/carbon element ratio on the fibrous carbide.

S-5500 manufactured by Hitachi, Ltd. was used as a scanning electron microscope, and EX-220SE manufactured by Horiba, Ltd. was used as an energy dispersive X-ray analyzer. As the ion milling device, IM4000 (manufactured by Hitachi High-Technologies Corporation) was used.

G. Strike-Through Rate

Photographs of the electrically conductive porous base material surface opposite to the surface of the gas diffusion electrode base material having the microporous layer were taken at 10 points at an observation magnification of 200 times using S-5500 manufactured by Hitachi, Ltd., and a portion covered with the carbonaceous powder was cut out from the obtained image, and binarization was performed using image processing software. In each of the obtained binarized images, the ratio (%) of the area of the portion covered with the carbonaceous powder to the photographed area was calculated, and the average value of the ratios was calculated and used as the strike-through rate.

H. In-Plane Gas Diffusibility

The in-plane gas diffusibility was obtained by flowing a nitrogen gas at a pressure of 5 KPa through the cross-section (through-thickness cross-section) perpendicular to the surface of the gas diffusion electrode base material and measuring the flow rate (cc/min) of the nitrogen gas. The measurement was performed such that the measurement area was 8 mm in length and 24 mm in width, and as the measuring device, a steam gas/water vapor permeation diffusion evaluation device MVDP-200C manufactured by Seika Corporation was used.

I. Power Generation Performance (GDE Method)

A catalyst liquid containing a platinum carrying carbon (manufactured by Tanaka Kikinzoku Kogyo K.K., platinum carrying amount: 50% by mass), purified water, "Nafion®" solution (manufactured by Sigma-Aldrich Japan, "Nafion®" 5.0% by mass) and isopropyl alcohol (manufactured by Nacalai Tesque, Inc.) was applied on the microporous layer to obtain a gas diffusion electrode base material with a catalyst layer. An electrolyte membrane ("Nafion®" manufactured by DuPont) was sandwiched by the gas diffusion electrode base material with a catalyst layer, and hot pressed to prepare a membrane electrode assembly (MEA). This membrane electrode assembly was incorporated into a single cell for a fuel cell, and power generation was performed at a battery temperature of 80° C., a fuel utilization efficiency of 70%, and an air utilization efficiency of 40%, with hydrogen on the anode side and air on the cathode side being humidified to have dew points of 70° C. A voltage at a current density of 1.5 A/cm$^2$ was measured.

Example 1

Using PTFE and a silicone-based water repellent processing additive, 10% by mass of PTFE in 100% by mass of the electrically conductive porous base material and 6% by mass in terms of solid content of the water repellent processing additive were attached to a carbon paper with a base material thickness of 150 μm and a base material density of 0.3 g/cm$^3$ by a slit die coater, and the carbon paper was dried at 120° C.

Carbon black (CB) having a primary particle size of 35 μm and a DBP absorption value of 180 mL/100 g as a carbonaceous powder, FEP as a fluororesin, a surfactant, and purified water as a dispersion medium were mixed and adjusted such that CB/water-repellent substance/surfactant/purified water=7 parts by mass/3 parts by mass/14 parts by mass/76 parts by mass to prepare an MPL ink.

The MPL ink was applied onto a carbon paper subjected to water repellent processing by a slit die coater and dried at 120° C., followed by heat treatment at 380° C., thus obtaining a gas diffusion electrode base material.

Table 1 shows evaluation results of the obtained gas diffusion electrode base material.

Example 2

Using PTFE and a silicone-based water repellent processing additive, 10% by mass of PTFE in 100% by mass of the electrically conductive porous base material and 16% by mass in terms of solid content of the water repellent processing additive were attached to the same carbon paper as in Example 1 by a slit die coater, and the carbon paper was dried at 120° C. Using the same MPL ink as in Example 1, the MPL ink was applied onto the obtained carbon paper, heat-treated and subjected to other processing in the same manner as in Example 1, thus obtaining a gas diffusion electrode base material.

Table 1 shows evaluation results of the obtained gas diffusion electrode base material. Although the power generation performance was good, the immersion to the microporous layer was greatly suppressed, so that the adhesion at the interface of the electrically conductive porous base material was slightly weak.

Example 3

Using PTFE as a fluororesin and a silicone-based water repellent processing additive, 10% by mass of PTFE in 100% by mass of the electrically conductive porous base material and 10% by mass in terms of solid content of the water repellent processing additive were attached to the same carbon paper as in Example 1 by a slit die coater, and the carbon paper was dried at 120° C. Using the MPL ink in which 1% by mass of pulp having an aspect ratio of 20 as a fibrous carbide was added to the same MPL ink as in Example 1, the MPL ink was applied onto the obtained carbon paper, heat-treated and subjected to other processing in the same manner as in Example 1, thus obtaining a gas diffusion electrode base material.

Table 1 shows evaluation results of the obtained gas diffusion electrode base material.

Example 4

Using PTFE as a fluororesin and a hydrocarbon-based water repellent processing additive, 10% by mass of PTFE in 100% by mass of the electrically conductive porous base material and 10% by mass in terms of solid content of the water repellent processing additive were attached to the same carbon paper as in Example 1 by a slit die coater, and the carbon paper was dried at 120° C. Using the same MPL ink as in Example 3, the MPL ink was applied onto the obtained carbon paper, heat-treated and subjected to other processing in the same manner as in Example 1, thus obtaining a gas diffusion electrode base material.

Table 1 shows evaluation results of the obtained gas diffusion electrode base material.

Example 5

Using PTFE and a silicone-based water repellent processing additive, 10% by mass of PTFE in 100% by mass of the electrically conductive porous base material and 10% by mass in terms of solid content of the water repellent processing additive were attached to carbon felt with a base material thickness of 150 μm and a base material density of 0.3 g/cm$^3$ by a slit die coater, and the carbon felt was dried at 120° C. Using the same MPL ink as in Example 1, the MPL ink was applied onto the obtained carbon paper, heat-treated and subjected to other processing in the same manner as in Example 1, thus obtaining a gas diffusion electrode base material.

Table 1 shows evaluation results of the obtained gas diffusion electrode base material.

Comparative Example 1

A carbon paper (TGP-H-060) with a base material thickness of 190 μm and a base material density of 0.45 g/cm$^3$ manufactured by Toray Industries, Inc. was used as an electrically conductive porous base material, and PTFE was used as a fluororesin. 10% by mass of PTFE in 100% by mass of the electrically conductive porous base material and 6% by mass in terms of solid content of a silicone-based water repellent processing additive were attached to the carbon paper by a slit die coater, and the carbon paper was dried at 120° C. Using the same MPL ink as in Example 1, the MPL ink was applied onto the obtained carbon paper, heat-treated and subjected to other processing in the same manner as in Example 1, thus obtaining a gas diffusion electrode base material.

Table 1 shows evaluation results of the obtained gas diffusion electrode base material. The MPL ink was immersed into the electrically conductive porous base material, the pore mode diameter of the electrically conductive porous base material became small, the gas diffusibility decreased, and the power generation performance also decreased.

Comparative Example 2

A gas diffusion electrode base material was obtained in the same manner as in Comparative Example 1 except that a carbon paper having a base material density of 0.24 g/cm$^3$ was used as an electrically conductive porous base material.

Table 1 shows evaluation results of the obtained gas diffusion electrode base material. Compared to Comparative Example 1, the MPL ink tended to be immersed into a low-density base material, the pore mode diameter of the electrically conductive porous base material became smaller, the gas diffusibility decreased, and the power generation performance also decreased. In addition, an MPL surface became rough. Since the number of holes on the surface of the microporous layer increased, a catalyst coating liquid could not be applied uniformly.

Comparative Example 3

Using PTFE as a fluororesin, 10% by mass of PTFE in 100% by mass of the electrically conductive porous base material and 6% by mass in terms of solid content of a silicone-based water repellent processing additive were attached to a carbon paper with a base material thickness of 150 μm and a base material density of 0.3 g/cm$^3$ by a slit die coater, and the carbon paper was dried at 120° C.

This electrically conductive porous base material was heat-treated at 380° C. before application of the MPL ink, and using the same MPL ink as in Example 1, the MPL ink was applied onto the obtained carbon paper, heat-treated and subjected to other processing in the same manner as in Example 1, thus obtaining a gas diffusion electrode base material.

Table 1 shows evaluation results of the obtained gas diffusion electrode base material. Since heat treatment at a high temperature was performed before forming the microporous layer, the manufacturing cost increased, and the productivity was lowered. The heat treatment before applying MPL greatly suppressed the immersion to the microporous layer, so that the adhesion at the interface of the electrically conductive porous base material was significantly reduced.

Comparative Example 4

A carbon paper was obtained as an electrically conductive porous base material in the same manner as in Comparative Example 3, and then an MPL ink was prepared with the same formulation as in Example 1 except that a carbon black (CB) having a primary particle size of 45 μm and a DBP absorption value of 140 mL/100 g was used as a carbonaceous powder. The MPL ink was applied, heat-treated and subjected to other processing in the same manner as in Example 1, thus obtaining a gas diffusion electrode base material.

Table 1 shows evaluation results of the obtained gas diffusion electrode base material. Since a large amount of the MPL ink was immersed, the pore mode diameter of the electrically conductive porous base material decreased, and the power generation performance decreased. Since the number of holes on the surface of the microporous layer increased, a catalyst coating liquid could not be applied uniformly.

Comparative Example 5

A carbon paper was obtained as an electrically conductive porous base material in the same manner as in Comparative Example 3. Subsequently, the same MPL ink as in Example 1 was applied in two portions by a slit die coater, and the MPL ink was heat-treated and subjected to other processing in the same manner as in Example 1, thus obtaining a gas diffusion electrode base material.

Table 1 shows evaluation results of the obtained gas diffusion electrode base material. Since the MPL ink was applied twice, the manufacturing cost increased, and the productivity was lowered. A large amount of the MPL ink was immersed, so that the pore mode diameter of the electrically conductive porous base material decreased, and the power generation performance decreased.

Comparative Example 6

Using PTFE, 10% by mass of PTFE in 100% by mass of the electrically conductive porous base material and 6% by mass in terms of solid content of a silicone-based water repellent processing additive were attached to the same carbon paper as in Example 1 by a slit die coater, and the carbon paper was dried at 120° C.

The same MPL ink as in Example 1 was prepared except that a vapor-grown carbon fiber (VGCF) having a fiber diameter of 150 nm, an oxygen/carbon element ratio of 0.005, and an aspect ratio of >20 was used as a carbonaceous powder, and the MPL ink was applied, heat-treated and subjected to other processing in the same manner as in Example 1, thus obtaining a gas diffusion electrode base material.

Table 1 shows evaluation results of the obtained gas diffusion electrode base material. Since the pore mode diameter of the microporous layer was large, a large amount of catalyst coating liquid was immersed, and the catalyst coating liquid could not be applied uniformly. Since the immersion to the microporous layer was suppressed greatly, the adhesion at the interface of the electrically conductive porous base material was significantly reduced. Since VGCF was used, the manufacturing cost increased, and the productivity was lowered.

TABLE 1-1

|  |  |  | Example 1 | Example 2 | Example 3 | Example 4 | Example 5 |
|---|---|---|---|---|---|---|---|
| Electrically conductive porous base material | Density | g/cm³ | 0.30 | 0.30 | 0.30 | 0.30 | 0.30 |
|  | Pore mode diameter | μm | 33 | 48 | 40 | 40 | 48 |
|  | Silicon/carbon element ratio | — | — | 0.022 | 0.055 | 0.035 | — | 0.035 |
|  | Oxygen/carbon element ratio | — | — | — | — | — | 0.008 | — |
| Microporous layer | Porosity | % | 80 | 80 | 80 | 80 | 80 |
|  | Surface roughness | μm | 5.6 | 5.2 | 4 | 4 | 5.5 |
|  | Pore mode diameter | μm | 0.08 | 0.08 | 0.08 | 0.08 | 0.08 |
|  | Number of holes | Number/cm² | 0.045 | 0.035 | 0.005 | 0.005 | >0.1 |
|  | Primary particle size of carbonaceous powder | nm | 35 | 35 | 35 | 35 | 35 |
|  | DBP absorption value of carbonaceous powder | mL/100 g | 180 | 180 | 180 | 180 | 180 |
|  | Oxygen/carbon element ratio of fibrous carbide | — | — | — | — | 0.05 | 0.05 | — |
| Gas diffusion electrode base material | Cumulative pore volume | μL/cm² | 1.6 | 3.3 | 2.5 | 2.5 | 3.6 |
|  | Strike-through rate | % | 5 | 1 | 1 | 1 | 5 |
|  | In-plane gas diffusibility | cc/min | 45 | 82 | 65 | 65 | 45 |
| Evaluation result | Power generation performance | V | 0.62 | 0.61 | 0.66 | 0.66 | 0.62 |
|  | Productivity | — | ○ | ○ | ○ | ○ | ○ |

TABLE 1-2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Electrically conductive porous base material | Density | g/cm³ | 0.45 | 0.24 | 0.30 | 0.30 | 0.30 | 0.30 |
|  | Pore mode diameter | μm | 29 | 28 | 55 | 28 | 29 | 55 |
|  | Silicon/carbon element ratio | — | — | — | — | — | — | — |
|  | Oxygen/carbon element ratio | — | — | — | — | — | — | — |
| Microporous layer | Porosity | % | 80 | 80 | 80 | 80 | 80 | 96 |
|  | Surface roughness | μm | 3.8 | 6.3 | 6.2 | 3.8 | 3 | 3 |
|  | Pore mode diameter | μm | 0.08 | 0.08 | 0.08 | 0.08 | 0.08 | 0.56 |
|  | Number of holes | Number/cm² | 0.05 | >0.1 | 0.05 | >0.1 | 0.01 | 0.01 |
|  | Primary particle size of carbonaceous powder | nm | 35 | 35 | 35 | 45 | 35 | — |
|  | DBP absorption value of carbonaceous powder | mL/100 g | 180 | 180 | 180 | 140 | 180 | — |
|  | Oxygen/carbon element ratio of fibrous carbide | — | — | — | — | — | — | 0.005 |
| Gas diffusion electrode base material | Cumulative pore volume | μL/cm² | 4.7 | 1.2 | 4.1 | 1.4 | 1.3 | 4.2 |
|  | Strike-through rate | % | 1 | 20 | 1 | 12 | 15 | 1 |
|  | In-plane gas diffusibility | cc/min | 38 | 35 | 82 | 39 | 35 | 90 |
| Evaluation result | Power generation performance | V | 0.3 | 0.3 | 0.52 | 0.3 | 0.3 | 0.5 |
|  | Productivity | — | ○ | ○ | x | ○ | x | x |

The invention claimed is:

1. A gas diffusion electrode base material having a microporous layer on one side of an electrically conductive porous base material,
   the electrically conductive porous base material containing carbon fiber and resin carbide and having a density of 0.25 to 0.39 g/cm³ and a pore mode diameter in a range of 30 to 50 μm, and
   the microporous layer containing a carbonaceous powder and a fluororesin and having a surface roughness of 2.0 to 6.0 μm, a porosity of 50 to 95%, and a pore mode diameter of 0.050 to 0.100 μm.

2. The gas diffusion electrode base material according to claim 1, wherein a silicon/carbon element ratio on a surface of the electrically conductive porous base material opposite to a surface of the electrically conductive porous base material having the microporous layer is 0.020 or more.

3. The gas diffusion electrode base material according to claim 1, wherein an oxygen/carbon element ratio on the surface of the electrically conductive porous base material opposite to the surface of the electrically conductive porous base material having the microporous layer is 0.005 or more.

4. The gas diffusion electrode base material according to claim 1, wherein a cumulative pore volume per 1 cm² in the pore mode diameter of 30 to 50 μm in the electrically conductive porous base material is 1.5 to 4.0 μL/cm².

5. The gas diffusion electrode base material according to claim 1, wherein the number of holes having a diameter of 150 μm or more on a surface of the microporous layer is 0.001 to 0.050 holes/cm².

6. The gas diffusion electrode base material according to claim 1, wherein a coverage (strike-through rate) of a carbonaceous powder on an electrically conductive porous base material surface opposite to a surface of the gas diffusion electrode base material having the microporous layer is less than 10%.

7. The gas diffusion electrode base material according to claim 1, which has an in-plane gas diffusibility of 40 to 80 cc/min.

8. The gas diffusion electrode base material according to claim 1, wherein a DBP absorption value of the carbonaceous powder contained in the microporous layer is 156 to 220 mL/100 g.

9. The gas diffusion electrode base material according to claim 1, wherein a primary particle size of the carbonaceous powder contained in the microporous layer is 20 to 39 nm.

10. The gas diffusion electrode base material according to claim 1, wherein the microporous layer further contains a fibrous carbide having a fiber diameter of 5 nm or more and 10 μm or less and an aspect ratio of 10 or more.

11. The gas diffusion electrode base material according to claim 10, wherein an oxygen/carbon element ratio of the fibrous carbide is 0.020 or more.

12. A production method for the gas diffusion electrode base material according to claim 1, comprising simultaneously adding a fluororesin and a water repellent processing additive different from the fluororesin to an electrically conductive porous base material and then applying an MPL ink in which a carbonaceous powder, fluororesin particles, and a surfactant are dispersed in water.

13. The production method for a gas diffusion electrode base material according to claim 12, wherein a water repellent processing additive having a mass retention rate of 50% or less when heat-treated at a temperature of 300° C. or higher is used.

14. The production method for a gas diffusion electrode base material according to claim 12, wherein a silicone-based water repellent processing additive, a paraffin-based water repellent processing additive, or a polymer compound (hydrocarbon-based water repellent processing additive) having a side chain consisting of a perfluoroalkyl group or a hydrocarbon group in a main chain of an acrylate polymer is used as a water repellent processing additive.

15. A solid polymer fuel cell comprising:

a polymer electrolyte membrane;

a catalyst layer formed on each side of the polymer electrolyte membrane;

the gas diffusion electrode base material according to claim 1 formed outside the catalyst layer; and two separators sandwiching the polymer electrolyte membrane, the catalyst layer, and the gas diffusion electrode base material.

* * * * *